US011487608B2

(12) United States Patent
Brehm

(10) Patent No.: US 11,487,608 B2
(45) Date of Patent: *Nov. 1, 2022

(54) ENTITY RESOLUTION FRAMEWORK FOR DATA MATCHING

(71) Applicant: ROVI GUIDES, INC., San Jose, CA (US)

(72) Inventor: Michael James Brehm, Allen, TX (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/208,569

(22) Filed: Mar. 22, 2021

(65) Prior Publication Data
US 2021/0263793 A1    Aug. 26, 2021

Related U.S. Application Data

(63) Continuation of application No. 16/216,275, filed on Dec. 11, 2018, now Pat. No. 10,990,470.

(51) Int. Cl.
G06F 11/07   (2006.01)
G06F 11/14   (2006.01)
(Continued)

(52) U.S. Cl.
CPC ...... G06F 11/0793 (2013.01); G06F 11/0727 (2013.01); G06F 11/1474 (2013.01);
(Continued)

(58) Field of Classification Search
CPC ............. G06F 11/0727; G06F 11/0793; G06F 11/1474; G06N 3/0454; G06N 3/02; G06N 3/0445; G06N 3/082; G06N 3/088
See application file for complete search history.

(56) References Cited

U.S. PATENT DOCUMENTS 5,276,771 A * 1/1994 Manukian ............. G06K 9/627
                                                                 706/25
9,679,259 B1 * 6/2017 Frind ..................... G06N 20/00
(Continued)

FOREIGN PATENT DOCUMENTS

WO    2006121577    11/2006

OTHER PUBLICATIONS

Anonymous, "Autoencoder—Wikipedia," https://en.wikipedia.org/w/index.php?title=Autoencoder&oldid=840713500 [retrieved Jul. 2, 2018] (6 pages).

(Continued)

*Primary Examiner* — Joseph O Schell
(74) *Attorney, Agent, or Firm* — Haley Guiliano LLP

(57) ABSTRACT

Systems and methods are described for matching a corrupted database record with a record of a validated database. The system receives a corrupted record from a first database. The corrupted record is vectorized to create an input data vector. A denoised data vector is generated by applying a denoising autoencoder to the input data vector, where the denoising autoencoder is specific to the first database. The system compares the denoised data vector with each of a plurality of validated data vectors generated based on records of the validated database to determine that a first denoised data vector matches a matching vector. In response, the system trains the denoising autoencoder using a data pair that includes the input data vector and the matching vector. The system also outputs the validated record that was used to generate the first matching vector.

20 Claims, 6 Drawing Sheets

(51) Int. Cl.
*G06N 3/08* (2006.01)
*G06F 40/226* (2020.01)
*G06N 20/00* (2019.01)
*G06F 40/216* (2020.01)
*G06N 3/04* (2006.01)

(52) U.S. Cl.
CPC ........... *G06N 3/082* (2013.01); *G06F 40/216* (2020.01); *G06F 40/226* (2020.01); *G06F 2201/80* (2013.01); *G06N 3/0454* (2013.01); *G06N 20/00* (2019.01)

(56) References Cited

U.S. PATENT DOCUMENTS

| | | | |
|---|---|---|---|
| 10,095,922 B2* | 10/2018 | Myers | G06Q 10/107 |
| 10,719,706 B1* | 7/2020 | Nicotera | G06K 9/0063 |
| 2005/0271280 A1* | 12/2005 | Farmer | G06K 9/00832 382/224 |
| 2006/0224636 A1 | 10/2006 | Kathuria et al. | |
| 2007/0038682 A1 | 2/2007 | Kulesza et al. | |
| 2008/0168013 A1 | 7/2008 | Cadaret | |
| 2009/0125461 A1 | 5/2009 | Qi et al. | |
| 2009/0324107 A1* | 12/2009 | Walch | G06K 9/00872 382/224 |
| 2014/0181575 A1* | 6/2014 | Kalach | G06F 11/1435 714/6.11 |
| 2014/0188919 A1 | 7/2014 | Huffman et al. | |
| 2014/0358829 A1 | 12/2014 | Hurwitz | |
| 2016/0093048 A1* | 3/2016 | Cheng | G06K 9/6289 382/131 |
| 2016/0139977 A1 | 5/2016 | Ashani | |
| 2016/0350336 A1* | 12/2016 | Checka | G06K 9/4628 |
| 2017/0308557 A1 | 10/2017 | Cassidy et al. | |
| 2018/0285646 A1 | 10/2018 | Jalan | |
| 2018/0357753 A1* | 12/2018 | Lehtinen | G06N 3/0454 |
| 2019/0073594 A1 | 3/2019 | Eriksson et al. | |
| 2019/0096038 A1* | 3/2019 | El-Khamy | G06N 3/08 |
| 2019/0250984 A1 | 8/2019 | He et al. | |
| 2019/0287230 A1 | 9/2019 | Lu et al. | |
| 2019/0392293 A1 | 12/2019 | Bertrand et al. | |
| 2020/0005901 A1* | 1/2020 | Cohen | G16H 50/30 |
| 2020/0012761 A1* | 1/2020 | El-Baz | G16B 40/20 |
| 2020/0106795 A1 | 4/2020 | Servajean et al. | |
| 2020/0117717 A1 | 4/2020 | Ramamurti et al. | |
| 2020/0183668 A1* | 6/2020 | Krishnamoorthy | G06K 9/6267 |

OTHER PUBLICATIONS

European Search Report for European Application No. 19215431.8, dated Mar. 13, 2020 (11 pages).

Mikolov, Tomas, et al. "Efficient Estimation of Word Representations in Vector Space," Sep. 7, 2013. available at, https://arxiv.org/pdf/1301.3781.pdf.

PCT International Search Report for International Application No. PCT/US2019/065510, dated Mar. 13, 2020 (17 pages).

Pennington, Jeffrey, et al. "GloVe: Global Vectors for Word Representation," available at, https://nlp.stanford.edu/pubs/glove.pdf.

Pinter, Yuval, et al. "Mimicking Word Embeddings using Subword RNNs," Jul. 21, 2017. retrieved, https://arxiv.org/pdf/1707.06961.pdf.

Thirumuruganathan, Saravanan, et al. "Data Curation with Deep Learning," Mar. 24, 2019. available at, https://arxiv.org/pdf/1803.01384.

* cited by examiner

ENTITY RESOLUTION FRAMEWORK FOR DATA MATCHING

This application is a Continuation of U.S. patent application Ser. No. 16/216,275, filed Dec. 11, 2018. The above-mentioned patent applications are assigned to the assignee of the present application and are hereby incorporated by reference as if fully set forth herein. The applicant hereby rescind any disclaimer of claim scope in the parent application or the prosecution history thereof and advise the USPTO that the claims in this application may be broader than any claim in the parent application.

BACKGROUND

The present disclosure relates to improved computer data storage and retrieval systems and methods, and more particularly, to techniques for matching a corrupted or incomplete record from a first database to a record in a validated database using a denoising autoencoder (DAE) that is specific to the first database.

SUMMARY

Modern computerized data storage and retrieval applications commonly face a task where a corrupted or incomplete database record from a first database has to be matched with a database record from a validated database. For example, when a financial system needs to make a decision regarding a loan application of an applicant, the financial system commonly needs to match a locally created database record for the applicant with validated record maintained by a trusted provider (e.g., by Experian™ or Equifax™). However, such matching may be difficult or impossible due to the locally created database record being incomplete or otherwise corrupted. For example, some data in the locally created database record may be missing, incomplete, unprocessable or erroneous. A data storage and retrieval application may be unable to definitively match such a corrupted record to a proper validated record. As a result, the financial system will have inaccurate data with which to make decisions (e.g., loan application decisions).

One approach to improving the matching capability of the data retrieval application (DRA) is to denoise the corrupted database record by using a denoising autoencoder (DAE). A typical DAE may provide poor denoising results because it was not trained specifically to denoise records for a database record-matching operation. Furthermore, a typical DAE is not trained to address the specific types of corruption that may be typical for a specific database. Typical DAEs are trained by creating artificial examples where random corruptions are introduced to a DAE vector. Such generic, artificial examples may train the DAE in a suboptimal manner. To overcome these problems, a denoising system and method are provided that use a DAE specific to the first database that is trained using training examples generated by the database record-matching attempts.

In some embodiments, the DRA receives a first corrupted record (e.g., a record with multiple metadata fields) from a first database (e.g., from a financial system). The DRA may generate a first input data vector based on the first corrupted record. For example, the DRA may convert textual metadata fields into numeric (e.g., binary), vector fields, and concatenate the vector fields together. The DRA then selects a denoising autoencoder (DAE) specific to the first database. For example, the DRA may have local or remote access to several DAEs, each configured for processing inputs from corresponding databases. The selected DAE may be already pretrained using a plurality of training example data pair. The training example data pairs may include an automatically generated data pair. For example, an automatically generated data pair may include two vectors, where one vector of the pair is artificially corrupted to generate the second vector of that pair. The training example data pairs may also include pairs specific to the database matching techniques, as will be explained below.

The DRA may generate a first denoised data vector by applying the selected DAE to the first input data vector. For example, the DRA may provide the first input data vector to the locally or remotely stored instance of the selected DAE and set the output of the DAE as the first denoised data vector. The DRA may compare the first denoised data vector with each of a plurality of validated data vectors generated based on records of a validated database. For example, the DRA may compare the first denoised data vector and a plurality of vectors that are generated by vectorizing records of the validated database. In one implementation, the DRA may determine that the first denoised data vector matches a first matching vector of the plurality of data vectors.

The DRA may provide a data pair comprising the first input data vector and the first matching vector as an additional training example data pair to the selected DAE. In another example, the DRA may provide a data pair comprising the first input data vector and the denoised data vector as an additional training example data pair to the selected DAE. In some embodiments, the DAE may then be trained using the new example data pair to better denoise inputs from the first database. The DRA may also retrieve a first validated record that was used to generate the first matching vector from the validated database. The DRA may then output (e.g., display) the retrieved first validated record. In one implementation, the DRA may transmit the retrieved first validated record to the first database for storage, thus improving the accuracy and completeness of the first database. In an implementation, the DRA uses data from the first validated record to make a loan application decision. For example, the DRA may decide whether to authorize or deny the loan application to the user whose data is stored in the first validated record. The DRA may then transmit the loan application decision to the first database.

Once the DAE is further trained using the additional training example, as described above, the DAE may be used to better denoise other corrupted records from the first database. In particular, the more often the process described above is repeated, the better the select DAE becomes at denoising data from the first database. When the next record is received from the first database, the DRA generates a second input data vector based on the second corrupted record and uses the DAE (that was trained using the new example data pairs) to denoise the second input data vector. The DRA compares the second denoised data vector to the plurality of validated data vectors to determine whether the second denoised data vector matches a second matching vector of the plurality of data vectors. If the second matching vector is found, the DRA retrieves and outputs the second validated record, which was used to generate the second matching vector.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
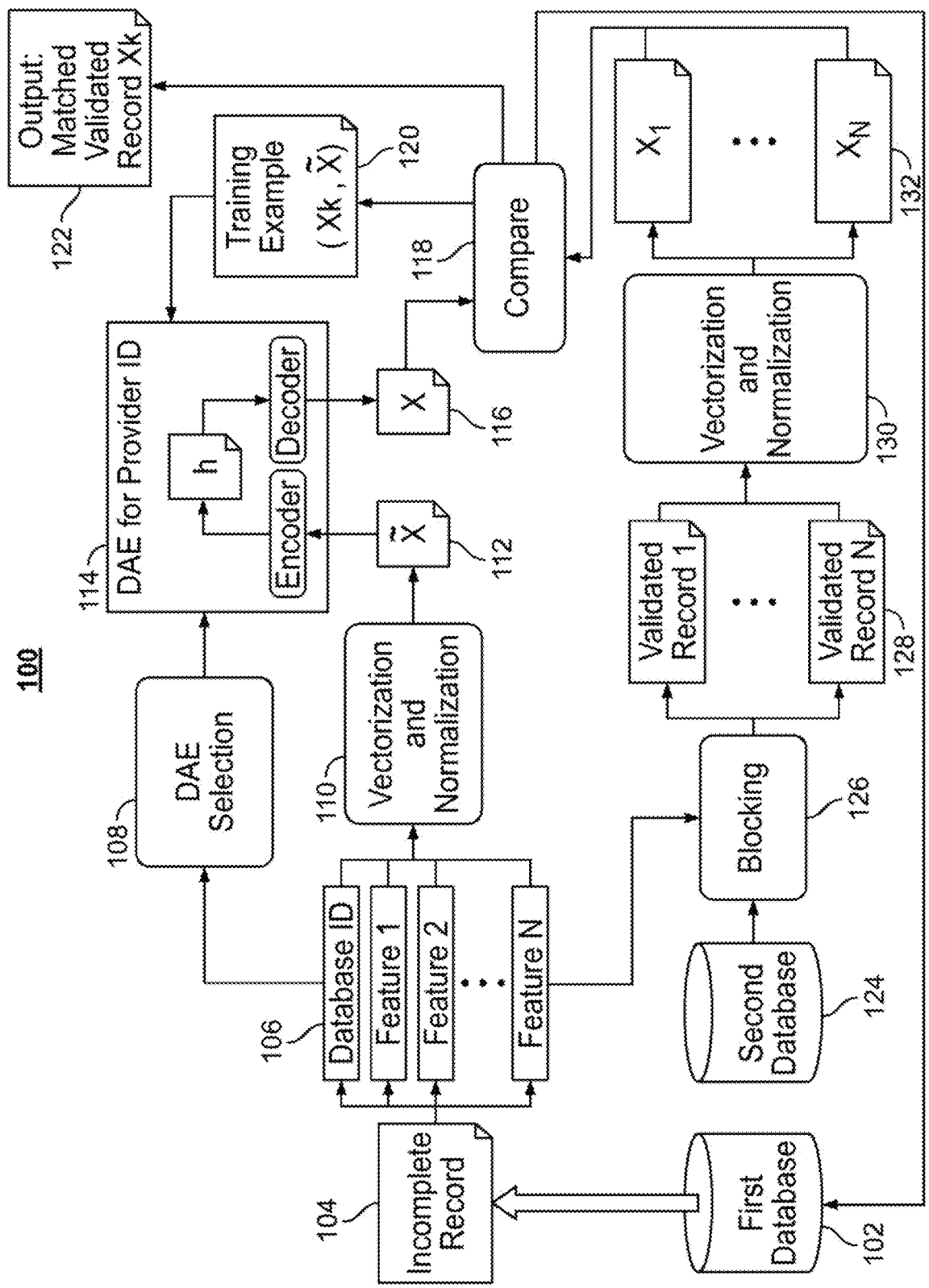
FIG. 1 shows a block diagram for matching a corrupted database record with a record of a validated database using a denoising autoencoder, in accordance with some embodiments of the disclosure.

FIG. 1 shows a block diagram for matching a corrupted database record with a record of a validated database using a denoising autoencoder. In particular, FIG. 1 shows the operation of a data retrieval application (DRA) 100. In some embodiments, some or all of the blocks of DRA 100 may be implemented on a single computer (e.g., a server) or using a plurality of networked computers (e.g., a server that stores first database 102 and a server that stores second database 124).

In some embodiments, the DRA may receive a corrupted record (e.g., incomplete record 104) from first database 102. For example, record 104 may include financial data of a loan applicant as shown in Table 1.

TABLE 1

| Label | Value |
|---|---|
| Database ID | 13245 |
| Bank Name | Golden 1 |
| First Name | John |
| Last Name | Doe |
| Birthday | 1980 |
| SSN | XXX-XX-1234 |
| Income | $100,000 |
| Debt | $ 25,000.00 |

In another example, record 104 may include metadata of a media asset (e.g., a TV series episode) as shown in Table 2.

TABLE 2

| Label | Value |
|---|---|
| Database ID | 13245 |
| Provider | HBO |
| Series Title | Game of Thrones |
| Season | 2 |
| Order Number | 7 |
| Release Date | 2012 |
| Episode Title | "A Man Without Honor" |

In some embodiments, record 104 may be corrupted. For example, records of the Golden 1 bank (database host of Table 1) may always contain only last 4 digits of the SSN number with other numbers being replaced with an "X" character. In another example, HBO (database host of Table 2) may always list only the year of the release date, instead of listing the date, month, and the year for the release date. Sometimes, some of the data items of Table 1 and Table 2 may be missing, or may include random noise (e.g., mistyped information).

At 106, the DRA may retrieve the database ID (e.g., as shown in Table 1 and Table 2 and the features of the database record (e.g., data items of Table 1 and Table 2). At 110, the DRA may vectorize the data fields of record 104. For example, the DRA may convert each field of the first plurality of data fields into binary notation. For example, line "HBO" may be converted into ASCII code as "0x480x420x4f" which may be further converted to binary code "010010000100001001001111." In some embodiments, other vectorization may be used (e.g., a vector encoding may be generated based on word-by-word mapping of words to numbers). The vectors may also be normalized (e.g., by using any known normalization technique). For example, data fields may be arranged in a certain order. The binary codes may also be concatenated to create a vector (X-tilde).

At 108, the DRA may select a DAE that is relevant to the source of first database 102. For example, the DRA may maintain a DAE for each unique database ID. In some embodiments, some similar databases may share a DAE. In some embodiments, the DRA selects DAE 114 (e.g., because it is the DAE that was assigned to Database ID No. 13245).

In some embodiments, DRA may maintain a plurality of DAEs in a database of DAEs. Each DAE may have accompanying metadata. For example, the metadata of each DAE may include a field identifying relevant databases that can be denoised by that DAE. In one implementation, field identifying relevant databases includes a list of database numbers. Whenever a record is received from a database, the DRA may access the database of DAEs to receive a list of database numbers for each DAE. The DRA may then search the lists to identify which list contains the database number included in the received record. The DAE associated with the selected list is then selected to process the incoming record.

Once DAE 114 is selected, the DRA may pass a vector X-tilde through DAE 114. In some embodiments, DAE 114 includes an encoder, a hidden layer, and a decoder (e.g., as will be further explained in FIG. 2). DAE 114 may produce a denoised vector X. The denoised vector may then be compared to a set of vectors X1-XN. Vectors X1-XN can be generated based on records of second database 124 as explained below.

Second database 124 may be a database that has been validated. For example, second database 124 may be validated financial database maintained by a trusted entity (e.g., by Experian™ or Equifax™). In some embodiments, the DRA may perform blocking 126 of records of second database 124. For example, instead of evaluating all data fields of the second database 124, the DRA may access only a subset of the data fields. For example, the DRA may retrieve only data fields listed in Table 1. In some embodiments, the DRA may include data fields known to be precise (e.g., last name). The blocked validated records 128 may be vectorized 130. In some embodiments, the vectorization for each record is performed the same way as vectorization 110 to produce vectors X1-XN.

At 118, the DRA may compare vector X to vectors X1-XN. For example, the DRA may count the percentage of binary pairwise matches between vector X and one of vectors X1-XN. If the percentage exceeds a threshold (e.g., 95%), the DRA may conclude that a match exists. For example, the DRA may determine that vector X matches vector X35.

Once the matching vector is found, the DRA may output 122 a record that was used to generate the matching vector. For example, the DRA may output Validated Record 35 when vector X matches vector X35. In some embodiments, the matching record may be sent to database 102 to improve the data stored in that database, e.g., by replacing incomplete record 104 with the validated record. In some embodiments, the matching record may be used to perform other functions (e.g., to validate loan applications).

In some embodiments, the matching record may be used to evaluate a loan application based on the validated record from second database 124. For example, first database 102 may be hosted by a financial system that is used by users to apply for a loan. In some embodiments, the financial records of the first database are corrupted or incomplete (which is common for records collected from users). In this example, the DRA uses the validated record instead of the corrupted record of the first database to make a loan decision. For example, the DRA may use factors such as income, debt, and credit score (contained in the validated record) to make the loan decision (e.g., by checking if these features match respective thresholds). The DRA may transmit the loan application decision to first database 102. First database 102 may then be used to inform a user about the loan application decision.

Additionally, a new training example 120 may be created for DAE 114. For example, the pair {X35, X-tilde} may be used as a training example to improve the ability of DAE 114 to denoise data from first database 102. In another, the pair {X, X-tilde} may be used as training example 120 to improve the ability of DAE 114 to denoise data from first database 102. Once DAE 114 is trained using the new training example, it will be better able to denoise other records from first database 102. Over time, DAE may learn to filter out noisy data specific to first database 102. For example, DAE may learn to filter out "XXX-XX-" value from "SSN" field of records of first database 102.

Figure 2:
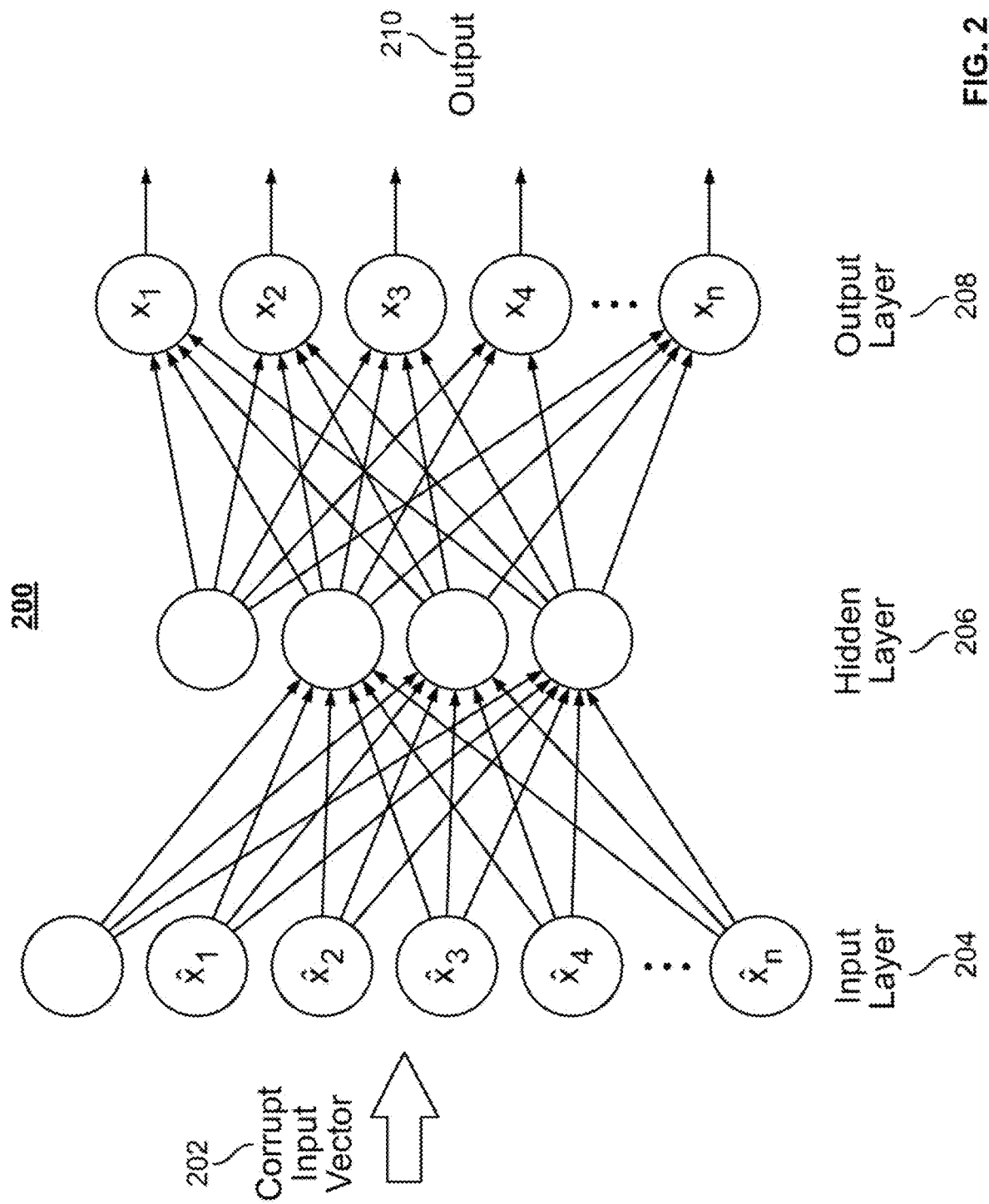
FIG. 2 shows an illustrative example of a denoising autoencoder, in accordance with some embodiments of the disclosure.

FIG. 2 shows an illustrative example of a denoising autoencoder 200, in accordance with some embodiments of the disclosure. For example, DAE 200 may be the same as DAE 114 of FIG. 1. In some embodiments, DAE 200 may include three neural networks: input layer 204, hidden layer 206, and output layer 208. Each neural network 204, 206, 208 may include multiple neurons and connections between neurons. Each neuron may be a data structure with two states (e.g., {1} or {ON} state, and {0} or {OFF} state). Each neuron may have positive or negative connections to neurons of previous the layer and/or to neurons of the next layer. Each connection may be used to communicate the state of the neuron to other neurons. For example, the positive connection may send the state of neuron, while the negative connection may send the inverse of the state of the neuron. The incoming connections may be used to set the state of the neuron. For example, if more {ON} signals are received than {OFF} signals, the neuron is set to the {ON} state. If more {OFF} signals are received than {ON} signals, the neuron is set to the {OFF} state. The connections may be added or removed as DAE 200 is trained (e.g., as explained in FIG. 5.)

When a corrupt input vector 202 (e.g., vector X-tilde) is fed into DAE 200, each bit of that vector may be mapped to one of the neurons of layer 204. For example, a value of {1} in vector X-tilde may cause the corresponding neuron of input layer 204 to be set to the {ON} state and a value of {0} in vector X-tilde may cause the corresponding neuron to be set to the {OFF} state. The connections between neurons may then determine the state of the hidden layer 206. In some embodiments, hidden layer 206 may have fewer neurons than layer 204. Because DAE 200 is forced to feed the information through the "bottleneck" of layer 206, the transition between layer 204 and 206 may be seen as an "encoder" (as shown in FIG. 1).

The connections between neurons in layer 206 and layers 208 may then determine the state of the hidden layer 208. In some embodiments, hidden layer 206 may have fewer neurons than layer 208. Because DAE 200 is forced to feeds the information through the "bottleneck" layer 206, the transition between layer 206 and layer 208 may be seen as a "decoder" (as showing in FIG. 1).

In some embodiments, some or all of the neurons may have a variable weight score. In one implementation, signals from neurons with higher weight scores may count more when determining a state of the next neuron. For example, if a neuron has a weight of "2," the input from that neuron may be weight the same as inputs from two neurons with weight "1."

Layer 208 may then be used to generate output 210. For example, a vector may be created based on states of neurons in layer 208. For example, a value of {1} in output vector X may be created when the corresponding neuron in layer 208 is set to {ON}, and a value of {0} in output vector X may be created when the corresponding neuron in layer 208 is set to {OFF}. In some embodiments, because vector X was forced through the "bottleneck" layer 206, some of the noise in vector X was eliminated.

Figure 3:
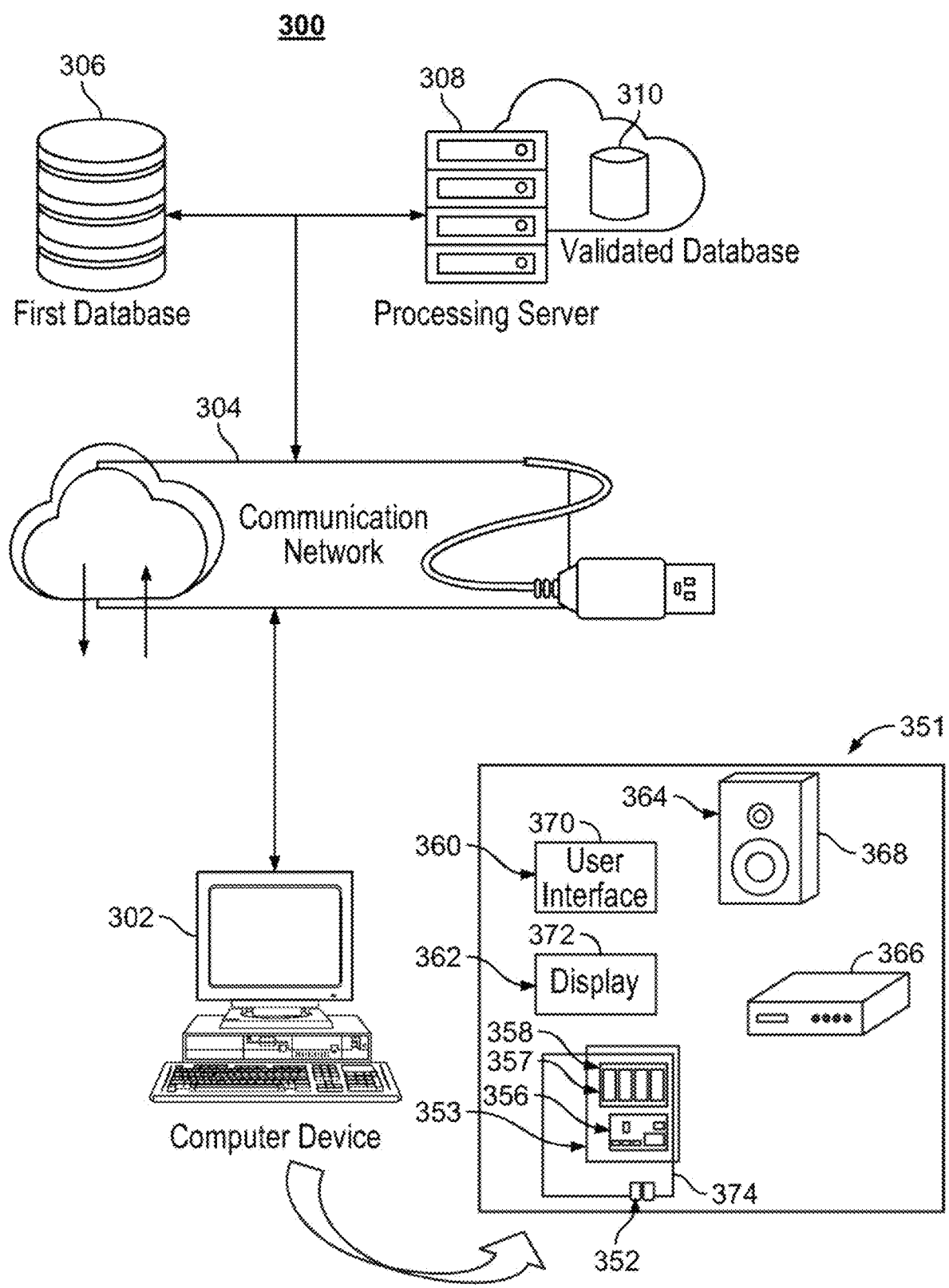
FIG. 3 is a block diagram of an illustrative data retrieval system in accordance with some embodiments of the disclosure.

FIG. 3 shows generalized embodiments of a system that can host a data retrieval application (DRA) in accordance with some embodiments of the disclosure. In system 300, there may be multiple devices, but only one of each is shown in FIG. 3 to avoid overcomplicating the drawing. Device 302 may be coupled to communication network 304. Device 302 may be any type of a computing device, such as a server, a desktop, a tablet, a smartphone, any other computing device or any combination thereof. Communication network 304 may be one or more networks including the Internet, a mobile phone network, mobile voice or data network (e.g., a 4G or LTE network), cable network, public switched telephone network, or other types of communication network or combinations of communication networks. Provider server 306 (e.g., a server that hosts the first database), processing server 308 (e.g., a server that hosts the validated database), and device 302 may be connected to communication path 304 via one or more communication paths, such as, a satellite path, a fiber-optic path, a cable path, a path that supports Internet communication (e.g., IPTV), free-space connections (e.g., for broadcast or other wireless signals), or any other suitable wired or wireless communication path or combination of such paths.

Although communication paths are not drawn between device 302, provider server 306 and processing server 308, these devices may communicate directly with each other via communication paths, such as short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The media devices may also communicate with each other directly through an indirect path via communication network 304.

System 300 includes provider server 306 coupled to communication network 304. There may be more than one of provider server 306, but only one is shown in FIG. 3 to avoid overcomplicating the drawing. Provider server 306 may include one or more types of content distribution equipment including a television distribution facility, cable system headend, satellite distribution facility, programming sources (e.g., television broadcasters, etc.), intermediate distribution facilities and/or servers, Internet providers, on-demand media servers, and other content providers. Provider server 306 may be a server of financial institution. For example, provider server 306 may store financial records of loan applicants who are applying for a loan via the provider server 306. Provider server 306 may also provide metadata. For example, provider server 306 may include a database storing metadata of a media asset.

The DRA may be, for example, a stand-alone application implemented on one of provider server 306, processing server 308, or device 302. For example, a DRA may be implemented as software or a set of executable instructions which may be stored in storage 358, and executed by control circuitry 353 of a device 302. In some embodiments, DRA may be client-server applications where only a client application resides on the media device, and a server application resides on processing server 308. For example, the DRA may be implemented partially as a client application on control circuitry 353 of device 302 and partially on processing server 308 as a server application running on control circuitry of processing server 308. When executed by control circuitry of processing server 308, the DRA may instruct the control circuitry to generate the DRA output (record of validated database 310 that matches first database of provider server 306) and transmit the generated output to one of device 302 or provider server 306. The server application may instruct the control circuitry of the provider server 306 to transmit a database record to processing server 308 or to device 302. The client application may instruct control circuitry of the device 302 to access validated database 310, conduct the matching operations as describe above and below and transmit the matching record to provider server 306. In some embodiments, any one of provider server 306, the processing server 308, or device 302 may include the hardware and software needed to operate a denoising autoencoder (DAE) configured as describe above or below.

Device 302 may include elements of a computer device 351. In some embodiments, provider server 306 and processing server 308 may also include some or all elements described in relation to device 302. As depicted, computer device 351 may be any computer system powered by processor 374. Computer device 351 may receive content and data via input/output (hereinafter "I/O") path 352. I/O path 352 may send database records, DAE service, and other data to control circuitry 353, which includes processing circuitry 356, display generator circuitry 357, and storage 358. Control circuitry 353 may be used to send and receive commands, requests, and other suitable data using I/O path 352. I/O path 352 may connect control circuitry 353 (and specifically processing circuitry 356) to one or more communication paths (described below). I/O functions may be provided by one or more of these communication paths, but are shown as a single path in FIG. 3 to avoid overcomplicating the drawing.

Control circuitry 353 may be based on any suitable processing circuitry such as processing circuitry 356. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Processing circuitry 356 may include display generation circuitry 357 or be separate from display generation circuitry 357. Display generation circuitry 357 may include display generation functionalities that enable generations for display on displays 362 and/or 372. In some embodiments, control circuitry 353 executes instructions for a user equipment device and/or application stored in memory (i.e., storage 358). Specifically, control circuitry 353 may be instructed by a user equipment device and/or application to perform the functions discussed above and below.

Device 302 may operate in a cloud computing environment to access cloud services. In a cloud computing environment, various types of computing services for content sharing, storage or distribution (e.g., audio sharing sites or social networking sites) are provided by a collection of network-accessible computing and storage resources, referred to as "the cloud." Cloud resources may be accessed by device 302 using, for example, a web browser, a DRA, a desktop application, a mobile application, and/or any combination of the above. Device 302 may be a cloud client that relies on cloud computing for application delivery, or the media device may have some functionality without access to cloud resources. For example, some applications running on device 302 may be cloud applications, i.e., applications delivered as a service over the Internet, while other applications may be stored and run on the media device. In some embodiments, a user device may receive content from multiple cloud resources simultaneously. In some embodiments, media devices can use cloud resources for processing operations such as the processing operations performed by processing circuitry. In some embodiments, processing server 308 and provider server 306 may also be a part of cloud computing environment. For example, Device 302 may access one or both of processing server 308 and provider server 306 via a cloud service. In such client/server-based embodiments, control circuitry 353 may include communication circuitry suitable for communicating with one or both of processing server 308 and provider server 306. Communication circuitry may include a cable modem, an integrated services digital network (ISDN) modem, a digital subscriber line (DSL) modem, a telephone modem, an Ethernet card, or a wireless modem for communication with other equipment, or any other suitable communication circuitry. Such communication may involve the Internet or any other suitable communication networks or paths. In addition, communication circuitry may include circuitry that enables peer-to-peer communication of media devices, or communication of media devices in locations remote from each other. In some embodiments, the DRA is a client/server-based application that uses the cloud interface. Data for use by a thick or thin client implemented on computer device 351 is retrieved on demand by issuing requests to a server remote to the processing server 308 or provider server 306, respectively. For example, computer device 351 may receive inputs from the user via input interface 360 and transmit those inputs to a remote server (e.g., to one of processing server 308 and provider server 306) for processing and generating the corresponding outputs. The generated output is then transmitted to computer device 351 for presentation.

Memory may be an electronic storage device provided as storage 358 that is part of control circuitry 353. As referred to herein, the phrase "electronic storage device" or "storage device" should be understood to mean any device for storing electronic data, computer software, or firmware, such as random-access memory, hard drives, optical drives, solid state devices, quantum storage devices, gaming consoles, gaming media, or any other suitable fixed or removable storage devices, and/or any combination of the same. Non-volatile memory may also be used (e.g., to launch a boot-up routine and other instructions). Cloud-based storage may be used to supplement storage 358 or instead of storage 358.

A user, or another system, may send instructions to control circuitry 353 using user input interface 360 of computer device 351. User input interface 360 may be any suitable user interface, such as a remote control, mouse, trackball, keypad, keyboard, touch screen, touchpad, stylus input, joystick, voice recognition interface, or other user input interfaces. Display 360 may be a touchscreen or touch-sensitive display. In such circumstances, user input interface 360 may be integrated with or combined with display 362. Display 372 may be provided as a stand-alone device or integrated with other elements of computer device 351. Speakers 368 may be provided as integrated with other elements of computer device 351. The audio component of videos and other content displayed on display 372 may be played through speakers 368. In some embodiments, the audio may be distributed to a receiver (not shown), which processes and outputs the audio via speakers 368. In some embodiments, device 351 may include input/outputs other than the user input interface such as network interface or cloud interface. In one implementation, device 351 may only include input/outputs other than the user input interface and lack any kind of direct input interface 360.

Computer device 351 may include hardware or software DAE module 366. In some embodiments, DAE module 366 may be used to process vectors generated based on records received from the provider server 306 to be matched with vectors generated based on records received from processing server 308. In some embodiments, control circuitry 353 may be used to execute any functionality of a DRA describe in FIG. 1 by using the DAE provided by DAE module 366 in a manner describe above and below.

Figure 4:
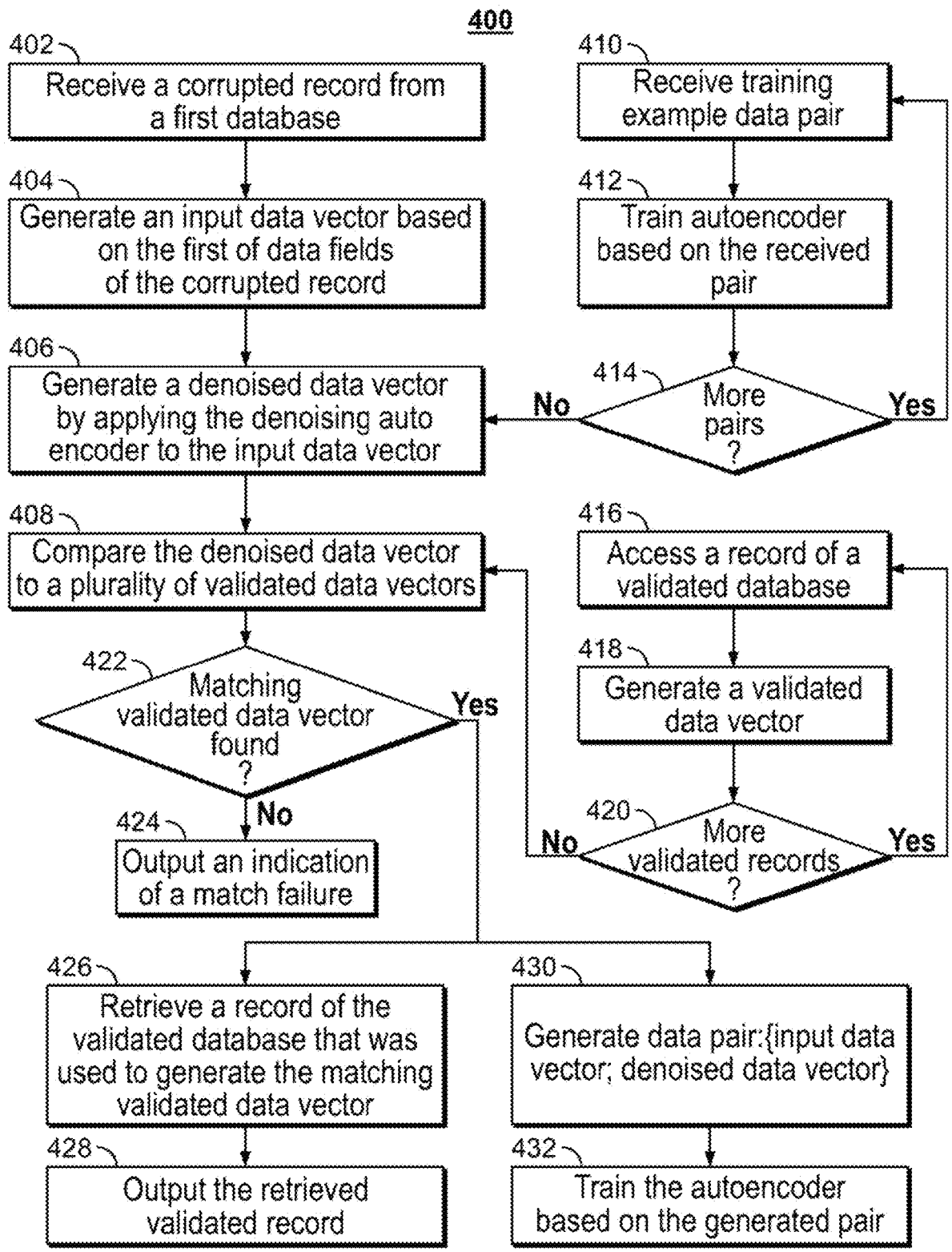
FIG. 4 is a flowchart of a detailed illustrative process for matching a corrupted database record with a record of a validated database using a denoising autoencoder, in accordance with some embodiments of the disclosure.

FIG. 4 is a flowchart of an illustrative process for matching a corrupted database record with a record of a validated database using a denoising autoencoder (DAE), in accordance with some embodiments of the disclosure. In some embodiments, each step of process 400 can be performed by computer device 351 (e.g., via control circuitry 353) or any of the system components shown in FIG. 3. In another implementation, each step of process 400 can be performed by computer device processing server 308 (e.g., via control circuitry 353 of processing server 308)

Process 400 begins at block 402 where control circuitry 353 receives a first corrupted record from a first database (e.g., from a provider server 306). In one example, the first database may store financial records of loan applicants. In another example, the first database may store metadata records of media assets. In some embodiments, the first corrupted record may be received via network 304.

At 404, control circuitry 353 may generate a first input data vector based on the first corrupted record. For example, control circuitry 353 may convert data entries of the first corrupted record to binary form and concatenate them together to create an input (e.g., vector X-tilde as shown in FIG. 2.)

At 406, control circuitry 353 may generate a first denoised data vector (e.g., vector X as shown in FIG. 2.) by applying a DEA to the first input data vector. In some embodiments, the DAE may have been selected because it is the DAE that is designated as being dedicated to processing records from the first database. In some embodiments, the DAE may have been pre-trained using steps 410-414.

At 410, control circuitry 353 may receive a training example data pair. In some embodiments, the training example data pair is generated by starting with a data vector and introducing random corruptions into that data vector. The training example data pair may also be generated at step 432. At 412, control circuitry 353 may train the DAE based on the new data pairs (e.g., as described with respect to FIG. 5). At 414, control circuitry 353 may check if more pairs are available for training. If so, process 400 may return to block 410 to receive another data pair. Otherwise, the DAE may be provided to block 406 to be used in generating a first denoised data vector.

At 408, control circuitry 353 may compare the first denoised data vector with each of a plurality of validated data vectors (e.g., as generated in steps 416-418). For example, at 416, control circuitry 353 may access a record of a validated database. For example, the record may be retrieved from a validated database stored at processing server 308 via network 304. In some embodiments, the validated database may be a trusted financial database (e.g., database of a trusted credit score provider). In another example, the validated database may be a database of a trusted media asset metadata provider. At 418, control circuitry 353 may generate a validated data vector for that accessed validated record. For example, control circuitry 353 may convert the data fields of the validated data record to binary and concatenate the resulting binary numbers. At 420, control circuitry 353 may check if more validate records are available from the validated database. If so, process 400 may return to block 416 and process the next validated record. Otherwise, process 400 transmits the plurality of validated data vectors to block 408 to be used in the comparison operation.

At 408, control circuitry 353 checks if a match was identified by comparisons in step 422. If the denoised data vector matched a first matching vector (of the vectors generated at 418), process 400 proceeds to 426 and 430. Otherwise, at block 424, control circuitry 353 may output an indication of a match failure. The indication of a match failure may be transmitted to the first database.

At 426, control circuitry 353 may retrieve, from the validated database (e.g., from processing server 308), a first validated record that was used to generate the first matching vector (e.g., at step 418). At 428, control circuitry 353 may output the retrieved first validated record. For example, control circuitry 353 may transmit the first validated record to the first database for storage in place of the corrupted record, thus improving the storage of the first database.

At 430, control circuitry 353 may generate a new example data pair. For example, control circuitry 353 may generate a data pair {input data vector; first matching vector} or {input data vector; denoised data vector}. Using at least one of these data pairs to train the DAE at block 432 results in the DAE becoming significantly better at denoising the type of corruption specific to the first database. For example, over time, DAE will become better at fixing the types of corruptions described above in relation to Table 1 and Table 2.

Once the DAE is trained at 432, it can be used to denoise other corrupted records that may be received from the first database in block 402 in the future. For example, when a second corrupted record is received, steps 404, 406, 408, 422, 426, and 428 may be repeated for the second corrupted record, except that at step 406 a DAE is used that was trained using the new example data pair generated at step 430.

Figure 5:
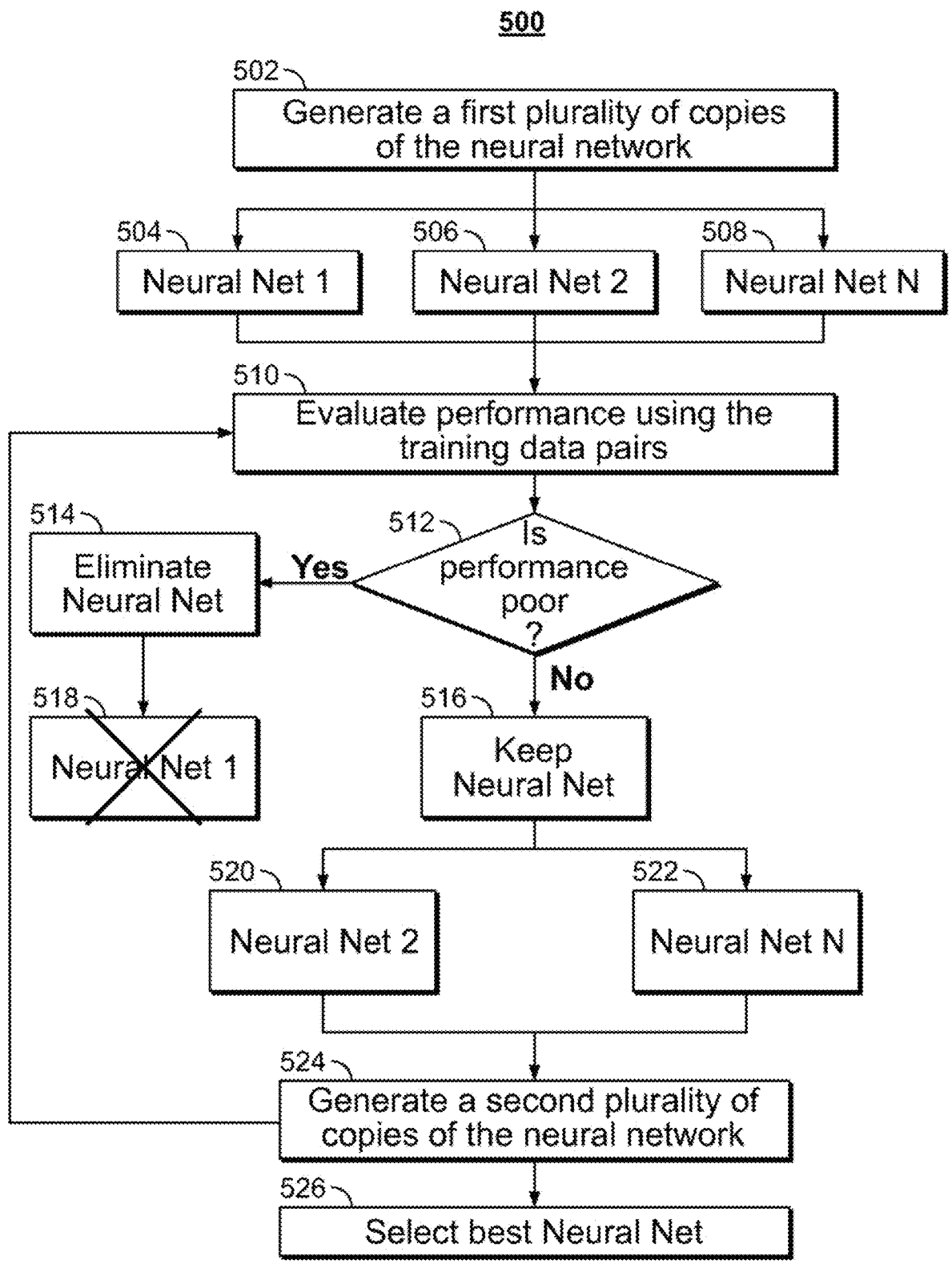
FIG. 5 is flowchart of a detailed illustrative process for training a denoising autoencoder, in accordance with some embodiments of the disclosure.

FIG. 5 is a flowchart of an illustrative process for training a denoising autoencoder, in accordance with some embodiments of the disclosure. In some embodiments, each step of process 500 can be performed by computer device 351 (e.g., via control circuitry 353) or any of the system components shown in FIG. 3. In another implementation, each step of process 500 can be performed by computer device processing server 308 (e.g., via control circuitry 353 of processing server 308). Process 500 may also be used to train the DAE at steps 412 and 432 of FIG. 4.

At 502, control circuitry 353 may generate multiple copies of a DAE (e.g., DAE 200 of FIG. 2). In some embodiments, at least some of the neuron connections of each of the copies may be randomized. For example, control circuitry 353 may generate neural net 1 at step 504, neural net 2 at step 506, and neural net N at step 508. Any number of other neural nets may be generated.

At 510, control circuitry 353 may evaluate performance of each of the neural nets 1-N using one or more example data pairs. For example, to test a data pair {input data vector; first matching vector} from step 430 of FIG. 4, control circuitry 353 may feed the input data vector through each of neural nets 1-N and compare the outputs to the first matching vector. For example, control circuitry 353 may generate a performance score based on how well the outputs match the first matching vector (e.g., what percentage of the bits matched).

At 512, control circuitry 353 may check performance of each of the neural nets 1-N (e.g., based on the performance score). If the performance score is below the threshold for a certain neural net (e.g., for neural net 1), that neural net is eliminated. For example, at step 514, control circuitry 353 may calculate an average performance score for each of neural nets 1-N and use it as the threshold. For example, control circuitry 353 may eliminate neural net 1 due to it having a performance score that is lower than the average performance score. At step 518, control circuitry 353 may erase neural net 1. If the performance is good, neural net may be kept at step 516. For example, at steps 520 and 522 control circuitry 353 may keep neural nets 2 and N due to each of them having performance score that are higher than the average performance score.

At 524, control circuitry 353 may generate a second plurality of copies of the neural network based on the copies of the neural network that have performed well. For example, control circuitry 353 may "breed" (e.g., combine) the neural nets that remained at step 516 together while introducing some new randomized changes. The second plurality of copies of the neural networks may be fed back to step 510 where process 500 may repeat to improve the performance of the plurality of neural nets 1-N. In some embodiments, the process may be repeated any number of times. At 526, control circuitry 353 selects the best-performing neural net of neural nets 1-N. This selected neural net may then be used at DAE in step 406 of FIG. 4.

Figure 6:
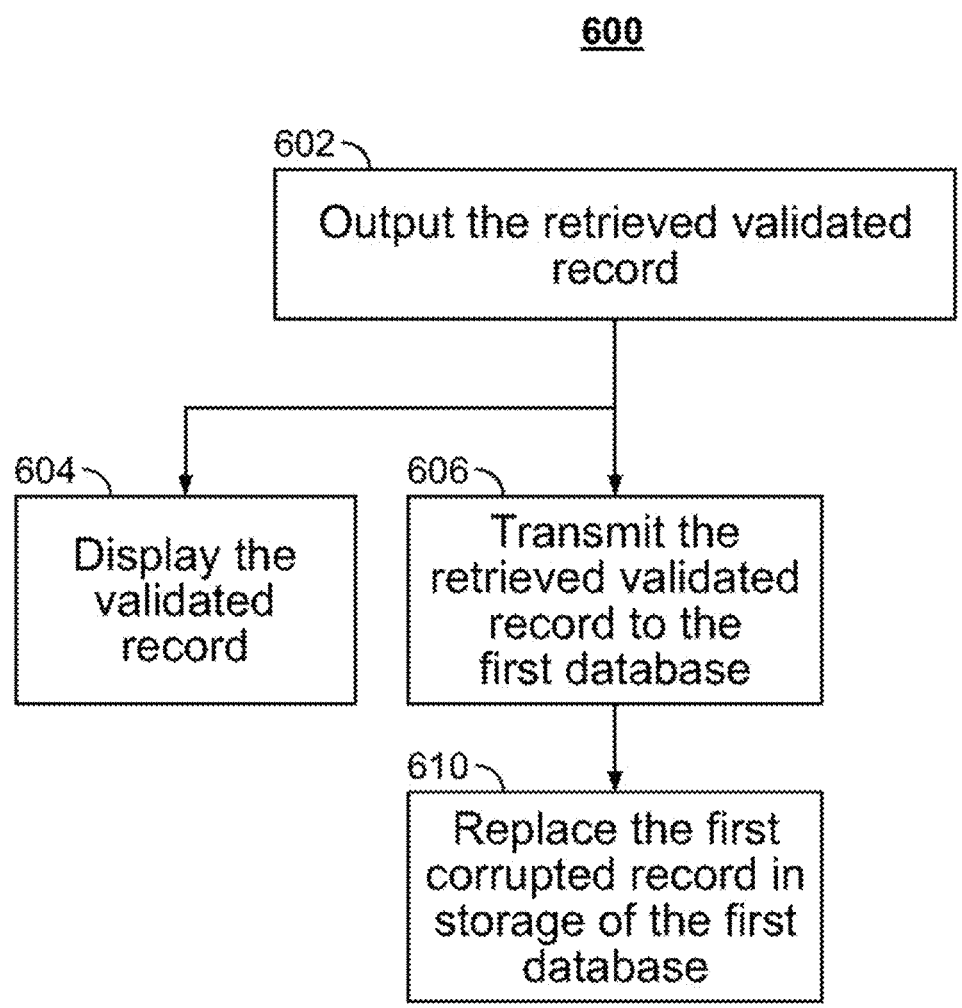
FIG. 6 is a flowchart of a detailed illustrative process for outputting a retrieved validated record, in accordance with some embodiments of the disclosure.

FIG. 6 is a flowchart of an illustrative process for outputting a retrieved validated record, in accordance with some embodiments of the disclosure. In some embodiments, each step of process 600 can be performed by computer device 351 (e.g., via control circuitry 353) or any of the system components shown in FIG. 3. In another implementation, each step of process 600 can be performed by computer device processing server 308 (e.g., via control circuitry 353 of processing server 308). Process 600 may be performed as part of step 428.

Process 600 begins at 602, where control circuitry 353 has retrieved the matching validated record and proceeds to output it using one or more of steps 604 and 606-610.

At 604, control circuitry 353 may display the validated record (e.g. on display 362 of device 351). For example, a user may request a record from the first database (e.g., database 102 of FIG. 1). Control circuitry 353 may determine that the record is corrupted or incomplete. In response, control circuitry 353 performs process 400 to acquire the validated record that matches the requested record. The validated record is then displayed instead of the corrupted record.

At 606, control circuitry 353 may transmit the validated record to the first database. For example, control circuitry 353 may send the validated record over network 304. At 610, the corrupted record from the first database may be replaced with the validated record, thus improving the storage of the first database. For example, if the first database stores metadata of a media asset, subsequent access requests to the first database will result in much better quality of metadata for that media asset.

It should be noted that processes 400-600 or any step thereof could be performed on, or provided by, any of the devices shown in FIGS. 1-3. For example, the processes may be executed by control circuitry 353 (FIG. 3) as instructed by a DRA. In addition, one or more steps of a process may be omitted, modified, and/or incorporated into or combined with one or more steps of any other process or embodiment (e.g., steps from processes 500 and 600 may be combined with steps from process 400). In addition, the steps and descriptions described in relation to FIGS. 4-6 may be done in alternative orders or in parallel to further the purposes of this disclosure. For example, each of these steps may be performed in any order or in parallel or substantially simultaneously to reduce lag or increase the speed of the system or method.

A DRA may be a stand-alone application implemented on a media device or a server. The DRA may be implemented as software or a set of executable instructions. The instructions for performing any of the embodiments discussed herein of the DRA may be encoded on non-transitory computer readable media (e.g., a hard drive, random-access memory on a DRAM integrated circuit, read-only memory on a BLU-RAY disk, etc.) or transitory computer readable media (e.g., propagating signals carrying data and/or instructions). For example, in FIG. 3 the instructions may be stored in storage 358, and executed by control circuitry 353 of a computer device 351.

The processes discussed above are intended to be illustrative and not limiting. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method comprising:
receiving a corrupted record from a first database;
generating a first input data vector based on the corrupted record using a denoising autoencoder, wherein the denoising autoencoder was trained using a plurality of records from the first database;
generating a second data vector based on a validated record from a validated database; and
in response to determining a match based on comparing the first input data vector with the second data vector:
transmitting the validated record to the first database.

2. The method of claim 1, further comprising, in response to determining that a match does not exist, outputting an indication of a match failure.

3. The method of claim 1, further comprising, in response to determining the match:
determining that the corrupted record is incomplete, wherein the corrupted record comprises an incomplete textual pair of data that consists of a label and a value; and
in response to determining that the corrupted record is incomplete:
transmitting from the first database a validated label and value to cause the first database to complete the corrupted record by inclusion of the validated label and value.

4. The method of claim 1, further comprising:
using an additional training example data pair as an input to a neural network;
generating an output based on the additional training example data pair as the input; and
evaluating the neural network's performance based on the output.

5. The method of claim 4, wherein training the denoising autoencoder using the plurality of records from the first database comprises adjusting neuron connections between neurons of a neural network based on the example data pairs.

6. The method of claim 1, further comprising:
accessing a plurality of denoising autoencoders;
selecting a denoising autoencoder, from the plurality of autoencoders, that is specific to the first database; and
using the selected autoencoder to generate the first input data vector based on the corrupted record.

7. The method of claim 6, wherein the denoising autoencoder specific to the first database further comprises a neural network that comprises an input layer, a hidden layer, and an output layer, and wherein the hidden layer includes fewer neurons than the input layer.

8. The method of claim 1, further comprising, providing a data pair comprising the first input data vector and the second data vector as a training example data pair to the denoising autoencoder to train the denoising autoencoder to denoise input from the first database.

9. The method of claim 1, further comprising:
comparing the first input data vector with a plurality of validated data vectors, wherein the comparison includes performing binary pairwise comparisons between elements of the first input data vector and elements of the plurality of validated data vectors; and
calculating a percentage of pairwise comparisons that resulted in a match.

10. The method of claim 9, further comprising, continuously updating the denoising autoencoder when a match is made between the first input data vector and one or more of the plurality of validated data vectors.

11. A system comprising:
communications circuitry of a device configured to receive a corrupted record from a first database; and
control circuitry of the device configured to:
generate a first input data vector based on the corrupted record using a denoising autoencoder, wherein the denoising autoencoder was trained using a plurality of records from the first database;
generate a second data vector based on a validated record from a validated database; and
in response to determining a match based on comparing the first input data vector with the second data vector:
transmit, using the communications circuitry, the validated record to the first database.

12. The system of claim 11, further comprising, in response to determining that a match does not exist, the control circuitry configured to output an indication of a match failure.

13. The system of claim 11, further comprising, in response to determining the match, the control circuitry configured to:
determine that the corrupted record is incomplete, wherein the corrupted record comprises an incomplete textual pair of data that consists of a label and a value; and
in response to determining that the corrupted record is incomplete:
transmit from the first database a validated label and value to cause the first database to complete the corrupted record by inclusion of the validated label and value.

14. The system of claim 11, wherein the control circuitry is further configured to:
use an additional training example data pair as an input to a neural network;
generate an output based on the additional training example data pair as the input; and
evaluate the neural network's performance based on the output.

15. The system of claim 14, wherein training the denoising autoencoder using the plurality of records from the first database comprises the control circuitry is configured to adjust neuron connections between neurons of a neural network based on the example data pairs.

16. The system of claim 11, wherein the control circuitry is further configured to:
access a plurality of denoising autoencoders;
select a denoising autoencoder, from the plurality of autoencoders, that is specific to the first database; and
use the selected autoencoder to generate the first input data vector based on the corrupted record.

17. The system of claim 16, wherein the denoising autoencoder specific to the first database further comprises a neural network that comprises an input layer, a hidden layer, and an output layer, and wherein the hidden layer includes fewer neurons than the input layer.

18. The system of claim 11, wherein the control circuitry is further configured to provide a data pair comprising the first input data vector and the second data vector as a training example data pair to the denoising autoencoder to train the denoising autoencoder to denoise input from the first database.

19. The system of claim 11, wherein the control circuitry is further configured to:
compare the first input data vector with a plurality of validated data vectors, wherein the comparison includes performing binary pairwise comparisons between elements of the first input data vector and elements of the plurality of validated data vectors; and calculate a percentage of pairwise comparisons that resulted in a match.

20. The system of claim 19, wherein the control circuitry is further configured to continuously update the denoising autoencoder when a match is made between the first input data vector and one or more of the plurality of validated data vectors.

\* \* \* \* \*